United States Patent [19]
Barton et al.

[11] Patent Number: 6,023,584
[45] Date of Patent: *Feb. 8, 2000

[54] INSTALLATION OF COMPUTER PROGRAMS USING DISK MIRRORING

[75] Inventors: Richard Redman Barton, Lexington; Myron Robert Merritt, St. Matthews; Richard Wescott, Columbia, all of S.C.

[73] Assignee: NCR Corporation, Dayton, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/778,523

[22] Filed: Jan. 3, 1997

[51] Int. Cl.⁷ ........................................................ G06F 4/445
[52] U.S. Cl. ................................. 395/712; 714/704
[58] Field of Search ........................ 364/551.01; 365/200; 395/182.04, 400, 441, 500, 438, 182.03, 489, 182.11, 701, 704, 712; 711/114, 162; 714/805, 5, 702, 704, 770

[56] References Cited

U.S. PATENT DOCUMENTS

| | | | |
|---|---|---|---|
| 5,435,004 | 7/1995 | Cox et al. ................................. | 707/205 |
| 5,519,844 | 5/1996 | Stallmo ................................... | 711/114 |
| 5,526,482 | 6/1996 | Stallmo et al. .......................... | 714/805 |
| 5,615,352 | 3/1997 | Jacobson et al. ........................ | 395/712 |
| 5,742,792 | 4/1998 | Yanai et al. .............................. | 711/162 |
| 5,819,310 | 10/1998 | Vishlitzky et al. ....................... | 711/114 |
| 5,835,953 | 11/1998 | Ohran ...................................... | 711/162 |
| 5,878,201 | 3/1999 | Onishi .......................................... | 714/6 |

FOREIGN PATENT DOCUMENTS

0729099A1  8/1995  France ............................. G06F 11/20

OTHER PUBLICATIONS

Grosse, "Repository Mirroring", ACM Trans. on Mathematical Software, vol. 21, No. 1, pp. 89–97, Mar. 1995.

IBMTDB, Improvement of the mirror write consistency algorithm, vol. 37, 2B, pp. 255–256, Feb. 1994.

IBMTDB, Automatic swap of the primary and secondary mirrors in a disk mirror system, vo. 36, bo 12, pp. 85–86, Dec. 1993.

Mogi et al., "Hot mirroing: a method of hiding parity update penalty and degradation during rebuilds fo RAID5", SIGMOD ACM, pp. 183–194, Jun. 1996.

Lee et al., "Petal: distributed virtual disks", ASPLOS VII, ACM, pp. 84–92, Oct. 1996.

Automatic swap of the primary and secondary mirrors in a disk mirror system IBM Technical Disclosure Bulletin, vol. 36, No. 12, pp. 85–86, Dec. 1993.

Improvement of the mirror write consistency algorithm, IBM Technical Disclosure Bulletin, vol. 37, No. 2, pp. 255–256, Feb. 1994.

*Primary Examiner*—Tariq R. Hafiz
*Assistant Examiner*—Anil Khatri
*Attorney, Agent, or Firm*—Gates & Cooper

[57] ABSTRACT

A computer-implemented method for installing a computer program from a removable data storage device using disk-mirroring techniques. The method includes the steps of mounting a removable data storage device containing the computer program as a read-only half of a mirrored logical volume identifying a fixed data storage device or hard disk drive as a read-write half of the mirrored logical volume; synchronizing the two halves of the mirrored logical volume by copying data from the removable data storage device to the hard drive; executing the computer program from the mirrored logical volume after an initial portion of the data is copied from the removable data storage device to the hard drive by the synchronization step and prior to a completion of the synchronization step; and removing the removable data storage device after the synchronization step is completed, thereby un-mirroring the logical volume. The removable data storage device may be a CD-ROM drive, floppy disk drive or tape drive.

15 Claims, 2 Drawing Sheets

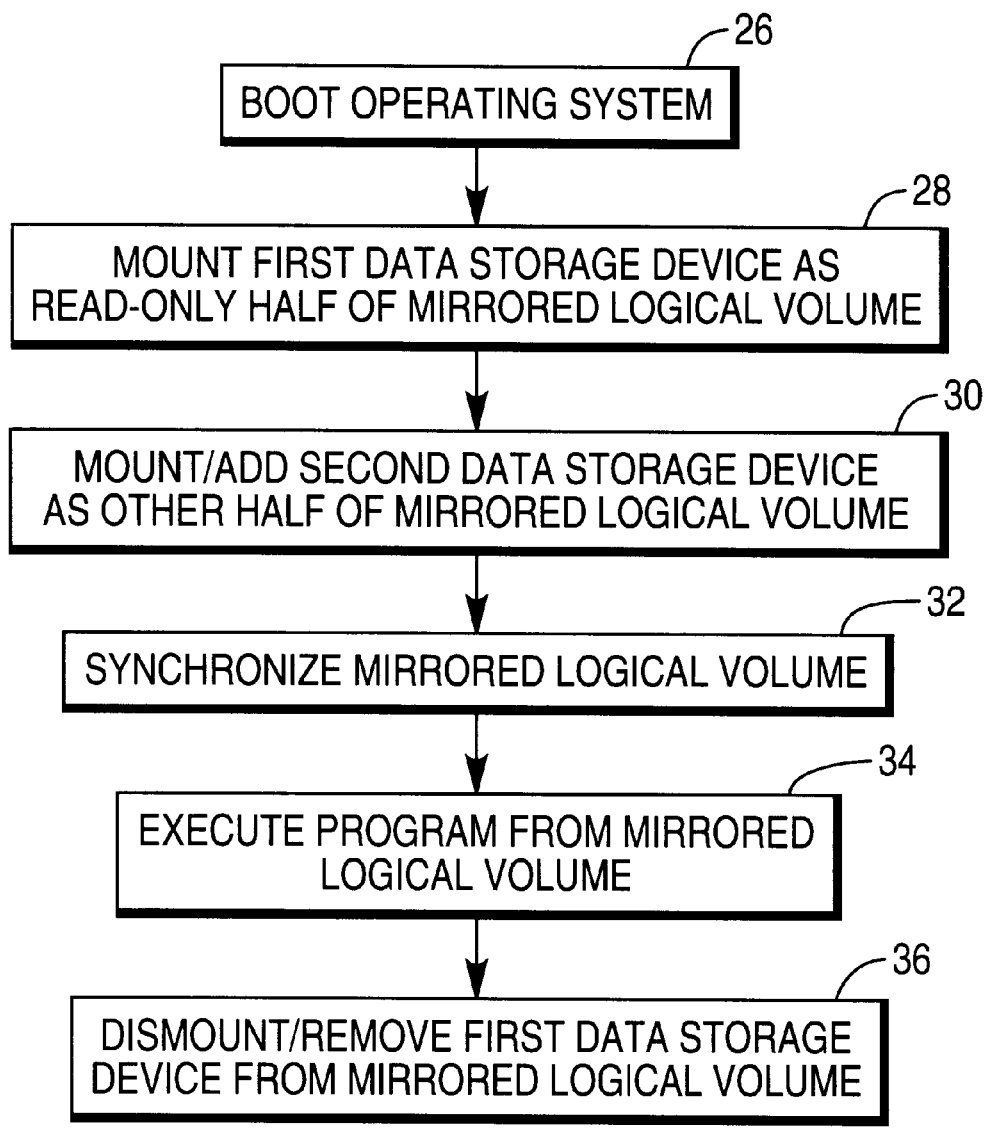

INSTALLATION OF COMPUTER PROGRAMS USING DISK MIRRORING

BACKGROUND OF THE INVENTION

1. Field of the Invention

The present invention relates generally to software installation, and in particular, to a computer-implemented method for installing a computer program using disk mirroring techniques.

2. Description of the Problem

Computer systems and some computer programs are typically not operable until software is installed. With computer systems, at minimum, an operating system, such as Windows NT, UNIX, or IBM's OS/2, must typically be installed to a root device, such as a hard drive, from which the computer system may boot the operating system when the computer system is reset or powered-up. The root device typically contains a small amount of software as required by the particular operating system.

Operating systems software is generally provided by vendors on removable media, such as CD-ROM, floppy disks and tapes. Special installation software contained on the removable media prepares the root device by installing the necessary software from the removable media to the root device in a format that is acceptable and expected by the operating system. Only after the operating system is installed on the computer system is the computer system usable for a purpose other than to complete the installation. Typical installation procedures can take from a few minutes to several hours before the computer system can be used by an operator.

There is consequently a need in the computer industry for a method for installing operating systems and other computer programs quickly. The present invention addresses this as well as other needs.

SUMMARY OF THE INVENTION

To address the deficiencies described above, the present invention discloses a method, apparatus, and article of manufacture for installing and executing a computer program on a computer. In accordance with the present invention, users can use the computer program while the computer copies the computer program from a first data storage device to a second data storage device in the background.

According to the invention, the first data storage device is provided with the computer program. To install and execute the computer program, a mirror is created between the first data storage device and the second data device. The computer program is then executed while the computer updates the second data storage device with the computer program of the first data storage device.

BRIEF DESCRIPTION OF THE DRAWINGS

Referring now to the drawings in which like reference numbers represent corresponding parts throughout:

FIG. 2 is a flow chart illustrating the general flow performed for the installation and execution of a computer program according to the principles of the present invention.

DETAILED DESCRIPTION OF THE DRAWINGS

Figure 1:
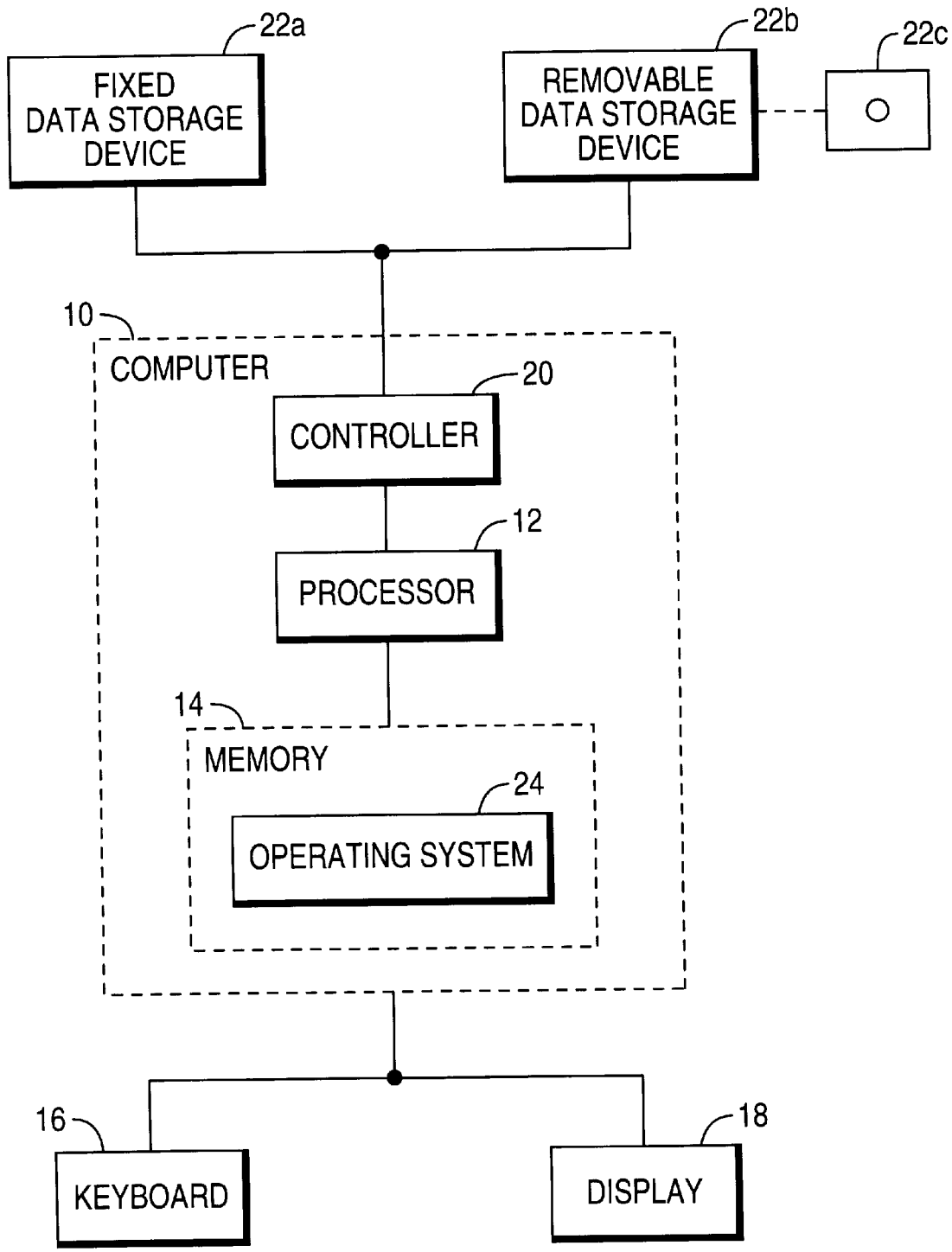
FIG. 1 is a block diagram illustrating an exemplary hardware environment used to implement an exemplary embodiment of the invention.

In the following description, reference is made to the accompanying drawings which perform a part hereof, and in which is shown by way of illustration exemplary embodiments of the invention. It is understood that other embodiments may be utilized and structural and functional changes may be made without departing from the scope of the present invention.

Overview

The present invention generally is a method, apparatus, and article of manufacture for installing a computer program using disk mirroring technology. The present invention utilizes the multi-tasking capabilities of the computer to execute the computer program in the foreground while the computer program is being copied from a first data storage device to a second data storage device in the background.

The computer program may be any type of program, such as an operating system, e.g,. Windows NT, Windows 95, UNIX, etc., or an applications program, e.g., Word, Groupwise, etc. The operating system may be a "piggyback" operating system, i.e., an operating system installed on top of another operating system, such as Windows NT which may be installed on top of DOS, or a "bootstrapping" operating system such as UNIX which is installed under the initial control of the computer. Application programs are typically installed using the operating system.

Environment

FIG. 1 is a block diagram illustrating an exemplary hardware environment used to implement an exemplary embodiment of the invention. The exemplary hardware environment includes a computer 10 having, inter alia, a processor 12, memory 14, keyboard 16, display 18, peripheral controller 20, fixed data storage device 22a (e.g., hard drive), and removable data storage device 22b (e.g., CD-ROM drive) along with its associated media 22c (e.g. CD-ROM). Other fixed or removable data storage devices, such as a floppy drive or tape drive, may be employed as well. Those skilled in the art will recognize that a combination of the above components and/or different components, peripherals, and other devices, may be used with the computer 10.

The computer 10 operates under the control of an operating system 24 stored in the memory 14 of the computer 10. The operating system 24 is generally tangibly embodied in one or more the data storage devices 22a–22c for loading into the memory 14 of the computer 10 during execution. The operating system 24 is a computer program comprised of instructions that when executed control the operations of the computer 10.

Generally, the computer 10 is not useable until the operating system 24 is installed. At a minimum, the operating system 24 must be installed to a "root" data storage device from which the operating system 24 can "boot" when the computer 10 is reset or powered up. The operating system 24 typically comprises a compilation of many different component computer programs, i.e., a kernel, file system, system utilities, and the like, and the root data storage device must contain a certain, specified, minimum amount of these components of the operating system 24, depending on the particular operating system 24, before the computer 10 will boot successfully.

Generally, the operating system 24 is provided by vendors on removable media 22c, such as CD-ROMs, floppy disks or tapes, that is mounted on the removable data storage device 22b. Special installation software prepares the designated root data storage device 22a to receive the operating system 24 and then copies all of the component computer programs that comprise the operating system 24 from the removable data storage device 22b to the root data storage device 22a. Until all the operating system 24 is installed on the root data storage device 22a, the computer 10 is not usable for any other purpose than to complete the installation. This can take from a few minutes to several hours before the operating system 24 is installed and the computer 10 can once again be used by a customer. The present invention shortens the time required for installing a new operating system 24 by allowing the customer to safely start the computer 10 before complete installation of the operating software 24 to the root data storage device 22a has occurred.

The present invention uses disk drive mirroring techniques, which are well known in the art, to mirror a removable data storage device 22b containing the operating system 24 with a fixed data storage device 22a, thereby creating a logical volume from the mirrored devices. This mirrored volume is then designated a root data storage device that can receive the operating system 24. A disk drive mirroring function within the controller 20 or the operating system 24 copies a root device image from the removable data storage device 22b to the fixed data storage device 22a, and then the remainder of the copying from the removable data storage device 22b to the fixed data storage device 22a can proceed as background processing, while the computer 10 is safely available for use by the customer.

Mirrored volumes are a traditional approach for improving reliability of disk drives. Mirrored volumes are often paired disk drives (or paired partitions or sub-portions of disk drives) that are synchronized with regard to the storage of data. Generally, the mirroring function is performed either in hardware or in software, i.e., in the controller 20 or the operating system 24. The mirroring function provides a single "view" of the contents of the mirrored volume, while a complete copy of the contents of the mirrored volume exists on each of the participating physical disk drives.

Mirroring is an expensive option since a logical volume is created by duplicating data across two physical disk drives. Further, every write to the logical volume comprises a write to the two physical drives in order to ensure synchronization. However, an optimized version of mirrored volumes allows reads to occur from either physical disk drive, so as to increase throughput.

Typically, a mirrored volume must be resynchronized upon certain events, i.e., when one of the physical disk drives fails and then is repaired, or when one of the physical disk drives is replaced, or when one of the physical disk drives simply gets out of synchronization with the other. At these times, the mirroring function synchronizes the out-of-sync disk drive of the mirrored volume by copying data from the current disk drive to the out-of-sync disk drive. Often, the operator can manually designate which disk drive should be considered a "primary" disk drive for the purposes of copying data to the other "backup" disk drive. Often, use of the mirrored volume can normally proceed after an initial portion of the primary disk drive is copied to the backup disk drive, but before the entire contents of the primary disk drive have been copied to the backup disk drive.

The present invention uses this mirroring function to install an operating system 24 or other computer program from a removable data storage device 22b, i.e., a CD-ROM drive, onto the fixed data storage device 22a., i.e., a fixed disk drive. In this scenario, a CD-ROM 22c is mounted on the removable data storage device 22b, wherein the CD-ROM 22c contains a copy of the operating system 24 or other computer program being installed. The CD-ROM 22c is mounted as a read-only half of a mirrored volume. The fixed data storage device 22a is then identified as the other, read-write half of the mirrored volume. Since the two halves of the mirrored volume are out of synchronization, and because the removable data storage device 22b is a read-only device, the mirroring function proceeds to synchronize the fixed data storage device 22a with the removable data storage device 22b.

After an initial portion is copied, the operating system 24 or other computer program present on the CD-ROM 22c is usable. The installation of the remaining portion of the operating system 24 or other computer program can proceed and changes can be made to the logical volume, while the two physical devices 22a and 22b that make up the logical volume are being synchronized. However, the changes will only appear on the fixed data storage device 22a, since the removable data storage device 22b is a read-only device. After installation is completed, the removable data storage device 22b can be removed from the logical volume, thereby un-mirroring the logical volume.

Installation and Execution

FIG. 2 is a flow chart illustrating the general flow performed for the installation and execution of a computer program according to the principles of the present invention. Block 26 represents the computer booting an operating system from a first data storage device. Block 28 represents the computer mounting a first data storage device as one half of a mirrored volume. Block 30 represents the computer mounting a second data storage device as the other half of the mirrored volume. Block 32 represents the computer synchronizing the mirrored volume by copying data from the first data storage device to the second data storage device. At some time during this process, but before synchronization is complete, the mirrored volume can be accessed by users, as indicated by Block 34, which represents a computer program being executed from the mirrored volume. Block 36 represents the computer dismounting or removing the first data storage from the mirrored volume, after synchronization has been completed.

During the synchronization step of Block 32, before the dismounting step of Block 36, data may be written to the mirrored volume. However, because the first data storage device is a read-only device, this data is written only to the second data storage device. This "selective mirroring" results in an out-of-sync condition between the two halves of the mirrored volume, yet nothing is done to resolve this condition. As a result, the second data storage device will contain data that mirror the data on the first data storage device, and will also contain data that does not mirror the data on the first data storage device.

This selective mirroring condition may be desirable from a safety standpoint, should the computer crash during installation, and may be necessary in cases where the first data storage device is a read-only device, such as a CD-ROM device. However, selective mirroring is not provided by conventional mirroring functions. Rather, conventional mirroring functions typically abort or crash when they are unable to write to a physical device of a mirrored volume. The present invention, on the other hand, avoids this problem and can write only to the second data storage device without failing.

Conclusion

The foregoing description of the exemplary embodiments of the invention has been presented for the purposes of illustration and description. It is not intended to be exhaustive or to limit the invention to the precise forms disclosed. Modifications and variations are possible in light of the above teaching. For example, any type of computer, such as a mainframe, mini computer, work station, personal computer or distributed computer system, could be used with the present invention. In addition, the steps need not be performed in the manner illustrated. It is intended that the scope of the invention be limited not by this detailed description, but extend to cover the full and fair scope of the claims set forth below.

What is claimed is:

1. A computer-implemented method for installing a computer program from a removable data storage device using disk mirroring techniques, comprising:

(a) mounting the removable data storage device containing the computer program as a read-only half of a mirrored logical volume, wherein the mirrored logical volume is designated as a root data storage device for execution of the computer program;

(b) identifying a fixed data storage device as a read-write half of the mirrored logical volume;

(c) synchronizing the two halves of the mirrored logical volume by copying data from the removable data storage device to the fixed data storage device;

(d) executing the computer program from the mirrored logical volume after an initial portion of the data is copied from the removable data storage device to the fixed data storage device by the synchronization step and prior to a completion of the synchronization step, wherein the initial portion comprises a root device image for the computer program; and (e) removing the removable data storage device after the synchronization step is completed thereby un-mirroring the logical volume.

2. The method of claim 1, wherein multi-tasking capabilities of the computer are utilized to execute the computer program in the foreground while the data is being copied from the removable data storage device to the fixed data storage device in the background.

3. The method of claim 1, wherein the computer program comprises an operating system.

4. The method of claim 1, further comprising writing other data only to the fixed data storage device, thereby resulting in a selective mirroring of the removable and fixed data storage devices.

5. The method of claim 4, wherein the selective mirroring results in an out-of-sync condition between the removable and fixed data storage devices.

6. An apparatus for installing a computer program from a removable data storage device using disk mirroring techniques, comprising:

(a) a computer;

(b) means, performed by the computer, for mounting the removable data storage device containing the computer program as a read-only half of a mirrored logical volume, wherein the mirrored logical volume is designated as a root data storage device for execution of the computer program;

(c) means, performed by the computer, for identifying a fixed data storage device as a read-write half of the mirrored logical volume;

(d) means, performed by the computer, for synchronizing the two halves of the mirrored logical volume by copying data from the removable data storage device to the fixed data storage device;

(e) means, performed by the computer, for executing the computer program from the mirrored logical volume after an initial portion of the data is copied from the removable data storage device to the fixed data storage device by the synchronization step and prior to a completion of the synchronization step, wherein the initial portion comprises a root device image; and (f) means for removing the removable data storage device after the means for synchronization is completed, thereby un-mirroring the logical volume.

7. The apparatus of claim 6, wherein multi-tasking capabilities of the computer are utilized to execute the computer program in the foreground while the data is being copied from the removable data storage device to the fixed data storage device in the background.

8. The apparatus of claim 6, wherein the computer program comprises an operating system.

9. The apparatus of claim 6, further comprising means for writing other data only to the fixed data storage device, thereby resulting in a selective mirroring of the removable and fixed data storage devices.

10. The apparatus of claim 9, wherein the selective mirroring results in an out-of-sync condition between the removable and fixed data storage devices.

11. An article of manufacture for use in installing a computer program from a removable data storage device using disk mirroring techniques, the method comprising:

(a) mounting the removable data storage device containing the computer program as a read-only half of a mirrored logical volume, wherein the mirrored logical volume is designated as a root data storage device for execution of the computer program;

(b) identifying a fixed data storage device as a read-write half of the mirrored logical volume;

(c) synchronizing the two halves of the mirrored logical volume by copying data from the removable data storage device to the fixed data storage device; and (d) executing the computer program from the mirrored logical volume after an initial portion of the data is copied from the removable data storage device to the fixed data storage device by the synchronization step and prior to a completion of the synchronization step, wherein the initial portion comprises a root device image for the computer program; and (e) removing the removable data storage device after the synchronization step is completed thereby un-mirroring the logical volume.

12. The method of claim 11, wherein multi-tasking capabilities of the computer are utilized to execute the computer program in the foreground while the data is being copied from the removable data storage device to the fixed data storage device in the background.

13. The method of claim 11, wherein the computer program comprises an operating system.

14. The method of claim 11, further comprising writing other data only to the fixed data storage device, thereby resulting in a selective mirroring of the removable and fixed data storage devices.

15. The method of claim 14, wherein the selective mirroring results in an out-of-sync condition between the removable and fixed data storage devices.

* * * * *